(12) United States Patent
Franciskovich

(10) Patent No.: US 11,639,591 B2
(45) Date of Patent: *May 2, 2023

(54) PANNING DEVICE AND METHODS

(71) Applicant: Mark Franciskovich, Poplar Grove, IL (US)

(72) Inventor: Mark Franciskovich, Poplar Grove, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/589,464

(22) Filed: Jan. 31, 2022

(65) Prior Publication Data

US 2022/0258174 A1  Aug. 18, 2022

Related U.S. Application Data

(63) Continuation-in-part of application No. 17/175,662, filed on Feb. 13, 2021, now Pat. No. 11,236,481.

(51) Int. Cl.
| | |
|---|---|
| *E02F 3/02* | (2006.01) |
| *A01B 1/02* | (2006.01) |
| *A01B 1/22* | (2006.01) |
| *B07B 13/08* | (2006.01) |
| *B03B 5/40* | (2006.01) |

(52) U.S. Cl.
CPC ............ *E02F 3/02* (2013.01); *B03B 5/40* (2013.01); *A01B 1/02* (2013.01); *A01B 1/22* (2013.01); *B07B 13/08* (2013.01)

(58) Field of Classification Search
CPC ..... E02F 3/02; A01B 1/02; A01B 1/22; B07B 1/02; B07B 13/08; B25G 3/26; B03B 5/40

USPC ............................................. 294/49, 57, 181
See application file for complete search history.

(56) References Cited

U.S. PATENT DOCUMENTS

| | | | |
|---|---|---|---|
| 1,080,903 A | 12/1913 | Fell | |
| 1,903,264 A * | 3/1933 | Palin | A01B 1/22 403/68 |
| 2,318,277 A | 2/1942 | Yensen | |
| 2,572,230 A * | 10/1951 | Williams | F23J 1/04 294/181 |
| 2,960,230 A | 12/1957 | Fracker | |
| 3,225,837 A * | 12/1965 | Richards | E02F 3/02 D8/13 |
| 4,477,972 A | 10/1984 | Testa | |
| 5,209,534 A | 5/1993 | Crenshaw | |

(Continued)

OTHER PUBLICATIONS

Forestry Suppliers, Conbar Telescopic Dipper, https://www.forestry-suppliers.com/product_pages/products.php?mi=65701&itemnum=53952&redir=Y (retrieved Feb. 13, 2021).

*Primary Examiner* — Dean J Kramer
(74) *Attorney, Agent, or Firm* — Braun IP Law, LLC; Jeanette M. Braun

(57) ABSTRACT

A panning tool is described and comprises a sifting scoop comprising an elongated half sphere of proportional dimensions. The left side wall, right side wall, and back wall of the sifting scoop define a reservoir for collecting sediment and holding precious metals and gems separated from the sediment during and after panning. The floor extends forwardly from the back side and can comprise riffles, furrows, or be flat. The panning tool comprises a connection body. The connection body is affixed to an interior face of the sifting scoop. Methods of using the panning tool and manufacturing the sifting scoop are also described.

22 Claims, 15 Drawing Sheets

(56) References Cited

U.S. PATENT DOCUMENTS

| | | | | |
|---|---|---|---|---|
| 5,699,700 A * | 12/1997 | Carmien | ................ | A01B 1/02 29/527.1 |
| 9,096,988 B2 * | 8/2015 | Price | ...................... | A01B 1/02 |
| 11,236,481 B1 * | 2/2022 | Franciskovich | ........ | B07B 13/08 |
| 2018/0163356 A1 * | 6/2018 | Koehler | ................ | A01B 1/04 |

* cited by examiner

PANNING DEVICE AND METHODS

CLAIM OF PRIORITY

The present application is a continuation-in-part of allowed U.S. patent application Ser. No. 17/175,662, filed on Feb. 13, 2021, hereby incorporated by reference as if fully restated herein.

FIELD OF THE DISCLOSURE

The disclosure generally relates to a panning tool for panning heavy elements, such as gold, silver, platinum, jewels, gems, or any other precious materials ("gold panning").

BACKGROUND OF THE DISCLOSURE

Gold panning can be performed by using manually powered tools. However, these manually powered tools are labor intensive, and require users to crouch during use.

Gold panning and methods of gold panning are highly regulated. For example, machines, pumps, or battery-powered devices cannot be used while gold panning. Gold and gems can be found several inches below the floor of a body of water or a dry land area. Typically, gold and gems are trapped under sediment. If gold and gems are found under the floor, holes cannot be left in the floor. This is difficult to accomplish due to the weight of the gold and sediment collected, along with the water's buoyant forces.

As a result, improvements in the field of gold and gem prospecting are needed, in order to maintain human health, reduce injury, comply with various regulations, and ensure practical and safe collection of gold and gems.

SUMMARY OF THE DISCLOSURE

Systems and methods directed to a panning device are disclosed. A method of manufacturing a sifting scoop is also disclosed.

A panning tool is disclosed. The panning tool comprises a sifting scoop comprising a one-piece main body. The one-piece main body can have an internal face and an external face. The one-piece main body may have a floor with a front edge, a left side wall curving upwardly along a left side of the floor, a right-side wall curving upwardly from a right side of the floor, and a back wall curving upwardly from a back side of the floor. The left side wall, right side wall, and back wall can cooperate to define a reservoir. The floor may extend forwardly from the back side. The panning tool may also have a connection body comprising a top end, a bottom end, a central throughbore that can be adapted to receive a fastener, and at least two openings that may accept a setting screw threaded through an external face of the connection body. The connection body may also be affixed to the interior face of the sifting scoop.

The panning tool can be an elongated half sphere of proportional dimensions and can comprise a top edge that angles down from the top to the bottom.

A method of panning precious metals is also disclosed. The method may comprise inserting a rod into a connection assembly on a back end of the sifting scoop, described in the disclosure for the panning tool, to form the panning tool. The panning tool can be placed into a body of water or a dry land bed, and the sifting scoop can collect sediments from the body of water or dry land bed. The method may comprise isolating the precious metals from the second portion of the sediments. The method can comprise removing the sediments by shaking, twisting, shaking and twisting, or wiggling the sifting scoop. The sifting scoop can be shaken, twisted, shaken and twisted, or wiggled by holding the extendable rod in a hand or by mechanical means and shaking, twisting, or shanking and twisting the rod. The movement of the extendable rod will wiggle the scoop.

A method of manufacturing a sifting scoop is further disclosed. The method may comprise machining the sifting scoop, wherein the sifting scoop may have a floor with a front edge, a left side wall curving upwardly along a left side of the floor, a right-side wall curving upwardly from a right side of the floor, and a back wall curving upwardly from a back side of the floor. The method can also comprise forming an opening into an internal face of a back end of the sifting scoop. The method may also comprise inserting a connection assembly into the opening located at the internal face of the back end of the sifting scoop.

These and other objects, features, and advantages of the present disclosure will become more readily apparent from the attached drawings and the detailed description of the preferred embodiments, which follow.

DETAILED DESCRIPTION

The invention is defined by the claims. The description is exemplary in nature and should not be used to limit the claims. Other embodiments are contemplated in accordance with the techniques described herein; such embodiments are within the scope of this application. Further, there is no intent to be bound by any expressed or implied theory presented in this application. The words "exemplary" or "illustrative" mean "serving as an example, instance, or illustration." Any implementations described as "exemplary" or "illustrative" are not to be construed as preferred or advantageous over other implementations. All the implementations described below are exemplary implementations, in order to enable people skilled in the art to make or use the disclosed embodiments and are not intended to limit the scope of the disclosure, which is defined by the claims.

Some features may be described using relative terms, such as "upper," "lower," "left," "rear," "right," "front," "vertical," "horizontal." Such relative terms are only for reference with respect to the appended Figures and are not meant to limit the disclosed embodiments. Hence, specific dimensions and other physical characteristics relating to the disclosed embodiments are not meant to limit the claims, unless expressly stated otherwise in the claims.

Figure 1:
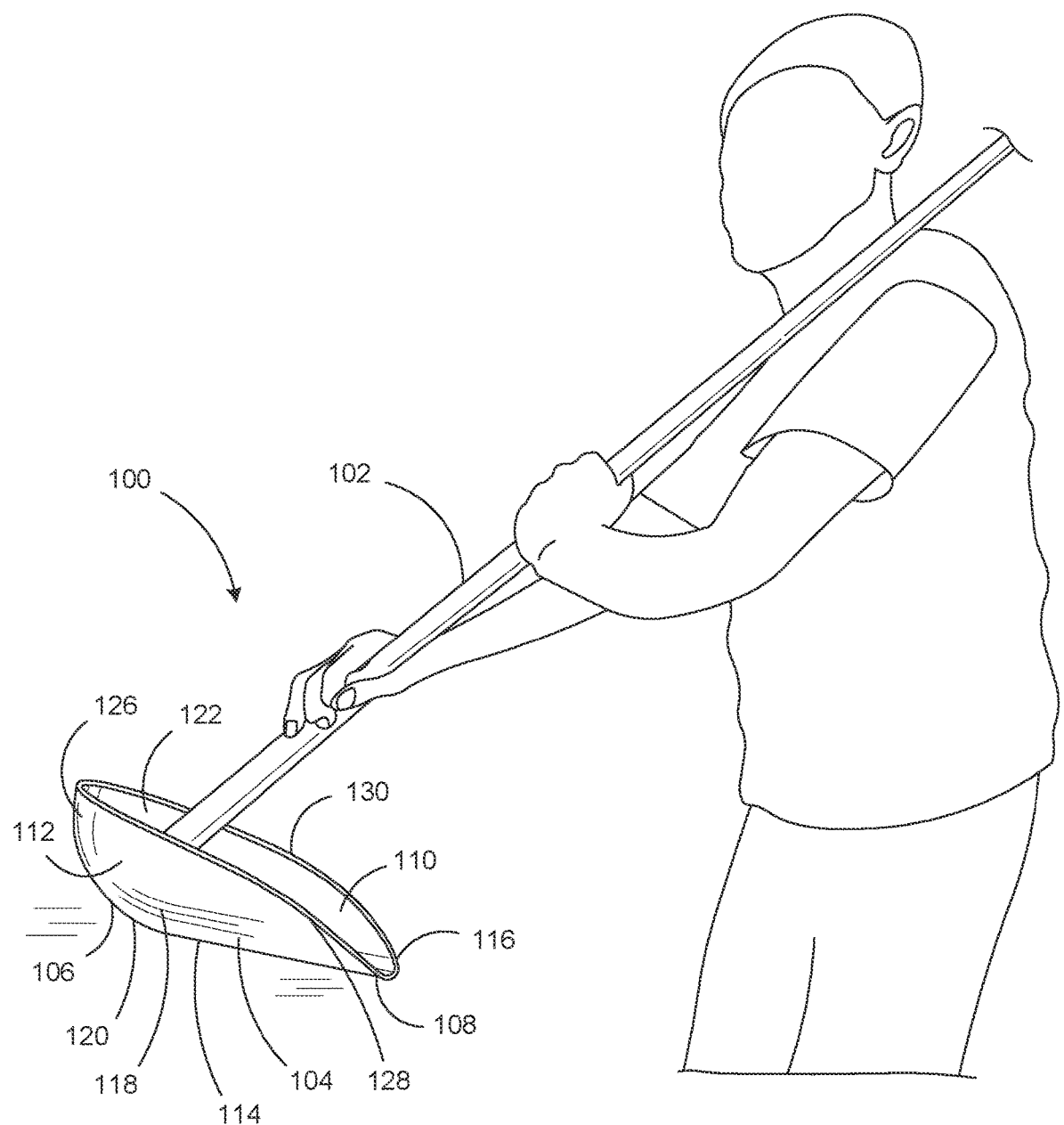
FIG. 1 is a perspective view of an exemplary embodiment of the panning tool described in the present disclosure.

FIG. 1 illustrates a perspective view of the panning tool 100. The panning tool 100 collects sediment that can have precious metals or gems and allows a user to stand while sifting the precious metals or gems out of the sediment and while operating the panning tool 100 in a body of water or dry land bed, not shown. The panning tool 100 can comprise an extendable rod 102 that can be removably engaged to a sifting scoop 104. The extendable rod 102 can be made of a material comprising aluminum, fiberglass, plastic, alloys, or combinations thereof. The panning tool 100 also comprises a sifting scoop 104. The sifting scoop 104 may have a back end 106 and a front end 108. The sifting scoop has an internal face 110 and an external face 112. The internal face 110 may have a floor 114, wherein the floor 114 may extend in a forward direction from the back end 106 and has a front edge 116. The front edge 116 of the floor 114 and portions of the floor 114 may be flat, which allows users to rest the sifting scoop 104, and the panning tool 100 generally, on the ground during use, not shown. The internal face 110 and external face 112 of the sifting scoop 104 may have a left sidewall 118. The left sidewall 118 of the internal face 110 of the sifting scoop 104 may curve upwardly along a left side 120 of the floor 114. The internal face 110 and external face 112 of the sifting scoop 104 may have a right sidewall 122. The right sidewall 122 of the internal face 110 of the sifting scoop 104 may curve upwardly along a right side 124 of the floor 114, as shown below in FIGS. 2C and 4A. The internal face 110 and external face 112 of the sifting scoop 104 may have a back sidewall 126. The back sidewall 126 of the internal face 110 of the sifting scoop 104 may curve upwardly from the floor 114 located at the back end 106 of the sifting scoop 104. The left sidewall 118 can have an edge 128 and the right sidewall 122 can have an edge 130. The edge 128 of the left sidewall 118 and the edge 130 of the right sidewall 122 may each have a downward slope from the back end 106 of the sifting scoop 104 to the front edge 116 of the floor 114 located on the internal face 110 of the sifting scoop 104. The downward slope of the edge 128 of the left sidewall 118 and the downward slope of the edge 130 of the right sidewall 122 allow the sifting scoop 104 to separate sediments and precious metals by density or specific gravity and remove sediments after use by shaking, twisting, shaking and twisting, or wiggling the extendable rod 102, which in turn wiggles the sifting scoop 104 side to side. A reservoir 132 may be defined by the left sidewall 118, the left side 120 of the floor 114, the right sidewall 122, the right side 124 of the floor 114, and the back sidewall 126, as shown below in FIGS. 2A and 4A. The reservoir 132 may collect heavy elements, precious metals, or precious materials, not shown.

Generally, the shape of the sifting scoop 104 can be an elongate half sphere of proportional dimensions and comprise a top edge that extends on an angle from the top of the back to the front edge.

In some aspects of the present disclosure, the extendable rod 102 can be secured to the back end 106 of the sifting scoop 104's internal face 110 at an angle, wherein the angle has a range between 30°-60°. The extendable rod 102 can be secured to the internal face 110 of the back end 106 of the sifting scoop 104 through a connection body 134, shown below in FIGS. 2A and 3A-4B. In some aspects of the present disclosure, a first and second end of the extendable rod 102, not shown, can be male or female threaded and may be releasably engageable to the connection body 134. Securing the extendable rod 102 to the connection body 134 located at the back end 106 of the sifting scoop 104's internal face 110 may support the panning tool 100 during use. In some aspects of the present disclosure, the extendable rod 102 can be secured to the connection body 134 at the internal face of the front end 108 of the sifting scoop 104. In other aspects of the present disclosure, the connection body 134 may be placed at different locations of the floor 114 located in the internal face 110 of the sifting scoop 104, which may cause the extendable rod 102 to be secured to the connection body 134 at an alternate angle less than the angle described above. The extendable rod 102 can be removed after using the panning tool 100. The sifting scoop 104 can be made of a material comprising aluminum, plastic, steel, iron, alloys, or combinations thereof. The sifting scoop 104 material can be corrosion and rust resistant.

Figure 2A:
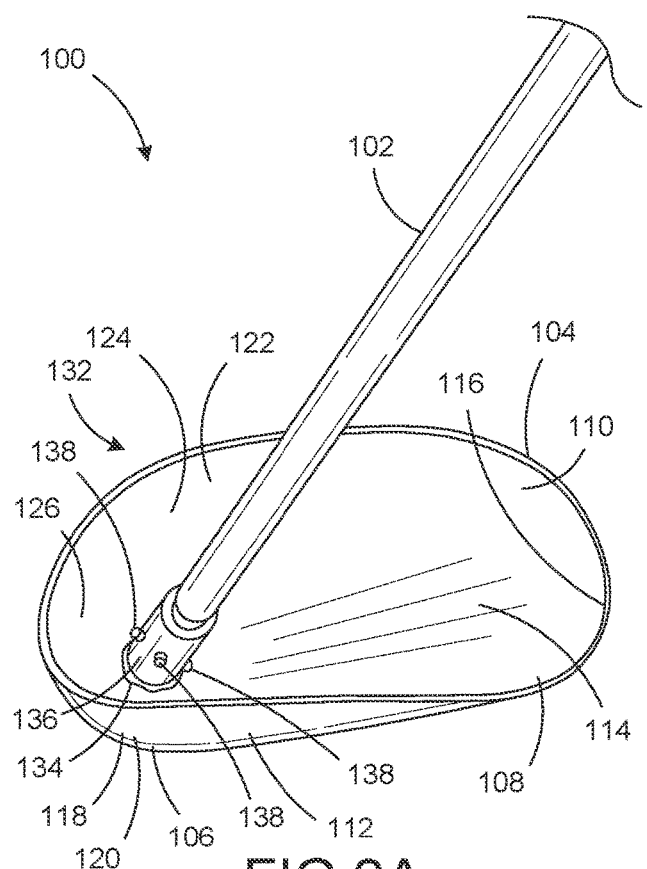
FIG. 2A is a left perspective view of an exemplary embodiment the panning tool described in the present disclosure.

FIG. 2A illustrates a left-perspective view of the panning tool 100. The panning tool 100 may comprise the extendable rod 102. The extendable rod 102 can be made of material comprising aluminum, fiberglass, plastic, alloys, or combinations thereof. The sifting scoop 104 has the back end 106 and the front end 108. The sifting scoop also has the internal face 110 and the external face 112. The internal face 110 has the floor 114, wherein the floor 114 may extend in the forward direction from the back end 106 and has the front edge 116. The internal face 110 and external face 112 of the sifting scoop 104 may have the left sidewall 118. The left sidewall 118 of the internal face 110 of the sifting scoop 104 may curve upwardly along the left side 120 of the floor 114. The internal face 110 and external face 112 of the sifting scoop 104 may have the right sidewall 122. The right sidewall 122 of the internal face 110 of the sifting scoop 104 may curve upwardly along the right side 124 of the floor 114. The internal face 110 and external face 112 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132 may be defined by the left sidewall 118, the left side 120 of the floor 114, the right sidewall 122, the right side 124 of the floor 114, and the back sidewall 126. The reservoir 132 may collect sediments and precious metals.

An opening, not shown, may be bored into the back end 106 of the sifting scoop 104. In some aspects of the present disclosure, the opening, not shown, may be added to the back end 106 of the sifting scoop 104 through a mold, not shown. The opening located on the internal face 110 of the back end 106 of the sifting scoop 104 may receive the connection body 134. In some aspects of the present disclosure, the connection body 134 can be welded to the internal face 110 of the back end 106 of the sifting scoop 104. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may secure the extendable rod 102 to the connection body 134. In some aspects of the present disclosure, the at least two setting screws 138 on the external face 136 of the connection body 134 may comprise a third setting screw 138, wherein the third setting screw 138 can be located at a perpendicular angle to the at least two setting screws 138. The third setting screw 138 may aid the at least two setting screws 138 in securing the extendable rod 102 to the connection body 134.

Securing the extendable rod 102 to the connection body 134 at the internal face 110 of the back end 106 of the sifting scoop 104 may support the panning tool 100 during use. In some aspects of the present disclosure, the connection body 134 and the extendable rod 102 can be secured at the angle defined above in FIG. 1. In some aspects of the present disclosure, the extendable rod 102 can be secured to the connection body 134 at the internal face 110 of the front end 108 of the sifting scoop 104. In other aspects of the present disclosure, the connection body 134 may be placed at different locations of the floor 114 located in the internal face 110 of the sifting scoop 104, which may cause the extendable rod 102 to be secured to the connection body 134 at an alternate angle less than the angle described above. The extendable rod 102 can be removed from the connection body 134 after using the panning tool 100.

Figure 2B:
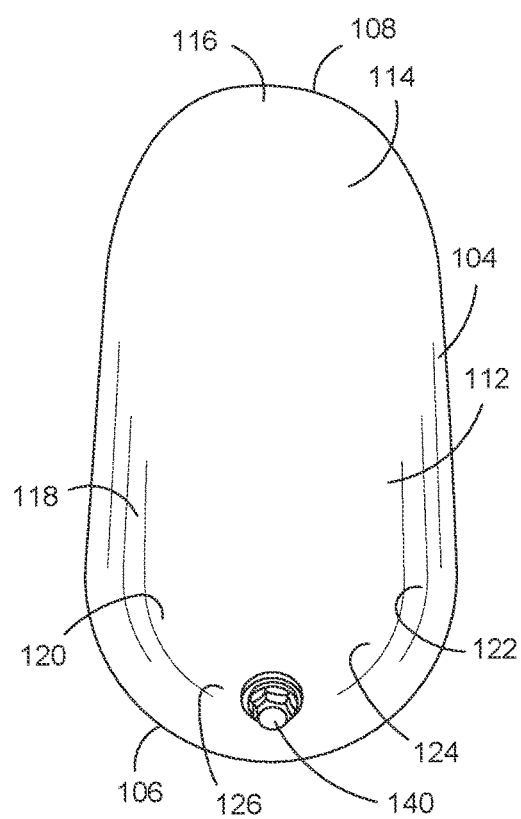
FIG. 2B is a bottom plan view of an exemplary embodiment of the sifting scoop described in the present disclosure.

FIG. 2B illustrates a bottom plan view of the sifting scoop 104. The sifting scoop 104 has the back end 106 and the front end 108. The sifting scoop also has the external face 112. The external face 112 of the sifting scoop 104 has the floor 114, wherein the floor 114 may extend in the forward direction from the back end 106 of the sifting scoop 104 and has the front edge 116. The front edge 116 of the floor 114 and portions of the floor 114 may be flat, which allows users to rest the sifting scoop 104 on the ground during use, not shown. The external face 112 of the sifting scoop 104 may have a left sidewall 118. The left sidewall 118 of the sifting scoop 104 may curve upwardly along a left side 120 of the floor 114. The external face 112 of the sifting scoop 104 may have a right sidewall 122. The right sidewall 122 of the sifting scoop 104 may curve upwardly along a right side 124 of the floor 114. The external face 112 of the sifting scoop 104 may have a back sidewall 126. The back sidewall 126 of the internal face 110 of the sifting scoop 104 may curve upwardly from the floor 114 located at the back end 106 of the sifting scoop 104. The reservoir 132, shown above in FIG. 2A, may be defined by the left sidewall 118, the left side 120 of the floor 114, the right sidewall 122, the right side 124 of the floor 114, and the back sidewall 126. The reservoir 132 may collect sediments and precious metals.

The opening, not shown, can be bored into the floor 114 and may be located at the back sidewall 126 of the sifting scoop 104. In some aspects of the present disclosure, the opening, not shown, may be added to the floor 114 and may be located at the back sidewall 126 of the sifting scoop 104 through a mold, not shown. A threaded screw 140 may fasten a bottom end 142 of the connection body 134, shown below in FIGS. 3A and 3D. In some aspects of the disclosure, the bottom end 142 of the connection body 134 may not enter the opening that may be located on the back sidewall 126 of the sifting scoop 104. The threaded screw 140 may protrude beyond the external face 112 of the back sidewall 126 of the sifting scoop 104. Fastening the bottom end 142 of the connection body 134 with the threaded screw 140 may prevent leakage of liquids from the sifting scoop 104. In some aspects of the disclosure, the threaded screw 140 may seal the connection body 134 to the sifting scoop 104.

Figure 2C:
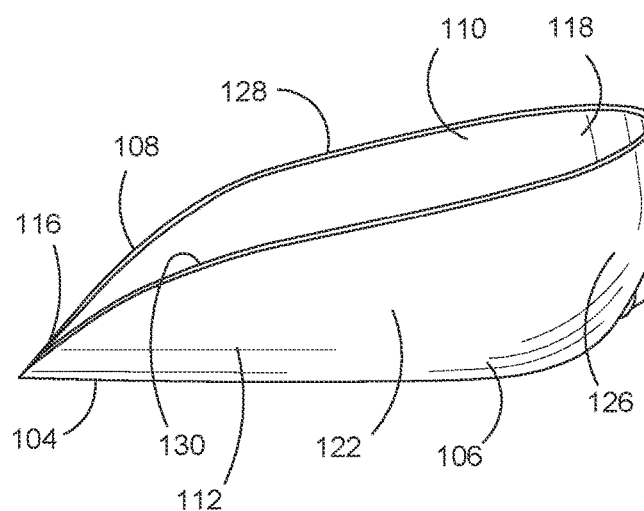
FIG. 2C is a side view of an exemplary embodiment of the sifting scoop described in the present disclosure.

FIG. 2C illustrates a side view of the sifting scoop 104. The internal face 110 and the external face 112 has the floor 114, shown above in FIG. 2A, wherein the floor 114 may extend in the forward direction from the back end 106 and has the front edge 116. The front edge 116 of the floor 114 and portions of the floor 114 may be flat, which allows users to rest the sifting scoop 104 on the ground during use, not shown. The internal face 110 of the sifting scoop 104 may have the left sidewall 118. The left sidewall 118 of the internal face 110 of the sifting scoop 104 may curve upwardly along a left side 120 of the floor 114, shown above in FIG. 2A. The external face 112 of the sifting scoop 104 may have a right sidewall 122. The right sidewall 122 of the internal face 110 of the sifting scoop 104 may curve upwardly along a right side 124 of the floor 114, shown above in FIG. 2A. The internal face 110 and external face 112 of the sifting scoop 104 may have a back sidewall 126. The back sidewall 126 of the internal face 110 of the sifting scoop 104 may curve upwardly from the floor 114 located at the back end 106 of the sifting scoop 104. The left sidewall 118 can have the edge 128 and the right sidewall 122 can have the edge 130. The edge 128 of the left sidewall 118 and the edge 130 of the right sidewall 122 may each have a downward slope from the back end 106 of the sifting scoop 104 to the front edge 116 of the floor 114 at the front end 108 of the sifting scoop 104. The downward slope of the edge 128 of the left sidewall 118 and the downward slope of the edge 130 of the right sidewall 122 allow the sifting scoop 104 to separate sediments and precious metals by density. The reservoir 132, shown above in FIG. 2A, may be defined by the left sidewall 118, the left side 120 of the floor 114, the right sidewall 122, the right side 124 of the floor 114, and the back sidewall 126. The reservoir 132, shown above in FIG. 2A, may collect heavy elements, precious metals, or precious materials.

Figure 2D:
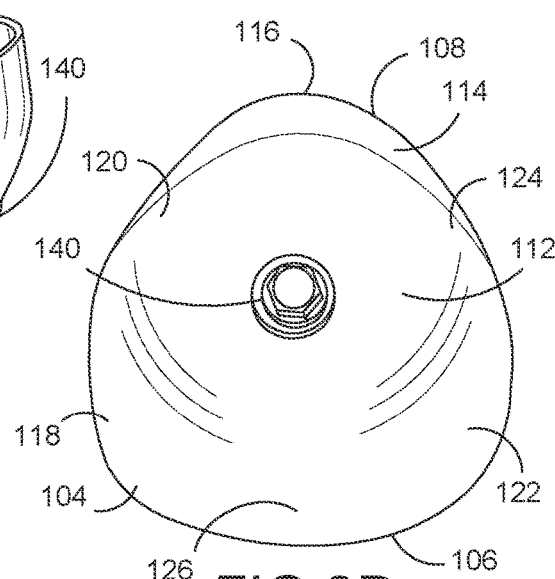
FIG. 2D is a rear plan view of an exemplary embodiment the sifting scoop described in the present disclosure.

FIG. 2D illustrates a rear plan view of the sifting scoop 104. The sifting scoop 104 has the back end 106 and the front end 108. The sifting scoop also has the external face 112. The external face 112 has the floor 114, wherein the floor 114 may extend in the forward direction from the back end 106 and has the front edge 116. The front edge 116 of the floor 114 and portions of the floor 114 may be flat, which allows users to rest the sifting scoop 104, and the panning tool 100 generally, on the ground during use, not shown. The external face 112 of the sifting scoop 104 may have the left sidewall 118. The left sidewall 118 of the internal face 110 of the sifting scoop 104 may curve upwardly along the left side 120 of the floor 114. The external face 112 of the sifting scoop 104 may have the right sidewall 122. The right sidewall 122 of the internal face 110 of the sifting scoop 104 may curve upwardly along the right side 124 of the floor 114. The internal face 110 and external face 112 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132, shown above in FIG. 2A, may be defined by the left sidewall 118, the left side 120 of the floor 114, the right sidewall 122, the right side 124 of the floor 114, and the back sidewall 126.

Figure 3A:
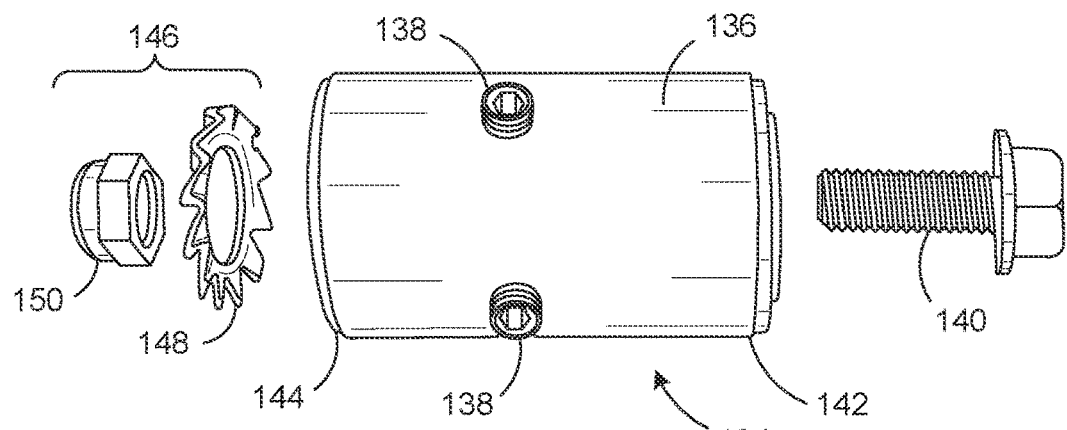
FIG. 3A is an exploded view of an exemplary embodiment of the connection body described in the present disclosure.

FIG. 3A illustrates an exploded view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a three setting screws 138, shown below in FIGS. 3B-3D, wherein the at least three setting screws 138 can be located at a perpendicular angle to the at least two setting screws 138. The third setting screw 138 may aid the at least two setting screws in clamping and securing the extendable rod 102 to the connection body 134. The connection body 134 has the bottom end 142 and a top end 144.

The threaded screw 140 may fasten the bottom end 142 of the connection body 134. Fastening the bottom end 142 of the connection body 134 with the threaded screw 140 may prevent leakage of liquids from the sifting scoop 104, not shown. In some aspects of the disclosure, the threaded screw 140 may seal the connection body 134 to the sifting scoop 104, shown above in FIGS. 2B-2D.

In an exploded view, a fastener 146, shown below in FIG. 3C, may comprise a crimp washer 148 and a lock nut 150. The fastener 146 may be formed by joining the crimp washer 148 and the lock nut 150 and inserted into a central throughbore 152 of the connection body 134. The central throughbore 152 of the connection body 134 may be adapted to receive the fastener 146. In some aspects of the present disclosure, the extendable rod may engage the fastener 146 located in the central throughbore 152. In some aspects of the present disclosure, the central throughbore may have male or female threading. In some aspects of the present disclosure, a first end and a second end of the extendable rod may have male or female threading, and matingly engage the male or female threading of the central throughbore 152 of the connection body 134.

Figure 3B:
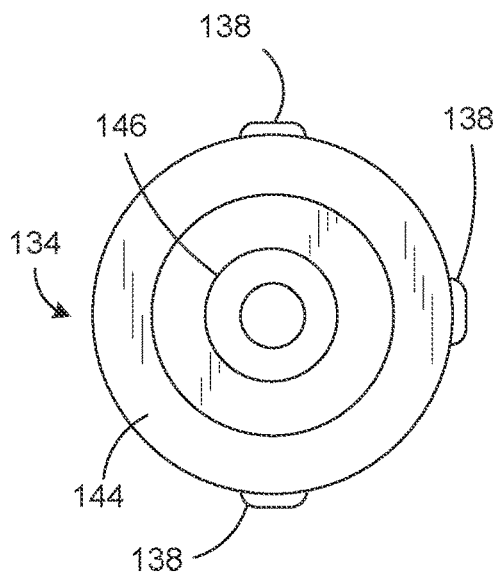
FIG. 3B is a bottom plan view of an exemplary embodiment of the connection body described in the present disclosure.

FIG. 3B illustrates a top plan view of the connection body 134. The external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, shown below in FIGS. 3B-3D, wherein the third setting screw 138 can be located at a perpendicular angle to the at least two setting screws 138. The third setting screw 138 may aid the at least two setting screws in clamping and securing the extendable rod 102 to the connection body 134. The central throughbore 152 located near the top end 144 of the connection body 134 may be adapted to receive the fastener 146 after male or female threading the central throughbore 152, seen below in FIG. 3C. In some aspects of the present disclosure, the extendable rod 102 may engage with the fastener 146 located in the central throughbore 152 of the connection body 134.

Figure 3C:
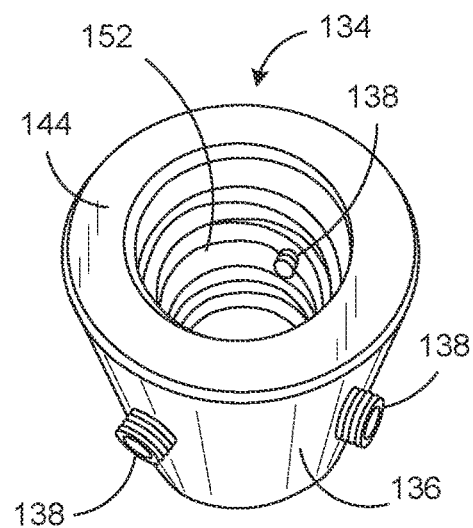
FIG. 3C is a top plan view of an exemplary embodiment of the connection body described in the present disclosure.

FIG. 3C illustrates a top plan view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, wherein the third setting screw 138 can be located at a perpendicular angle to the at least two setting screws 138. The central throughbore 152 located near the top end 144 of the connection body 134 may have male or female threading. In some aspects of the present disclosure, a first end and a second end of the extendable rod 102, shown above in FIGS. 1 and 2A, may have male or female threading, and matingly engage the male or female threading of the central throughbore 152 of the connection body 134. The central throughbore 152 is adapted to securely receive an end of an extendable rod 102 and allow the end of an extendable rod 102 to be removed from the central throughbore 152.

Figure 3D:
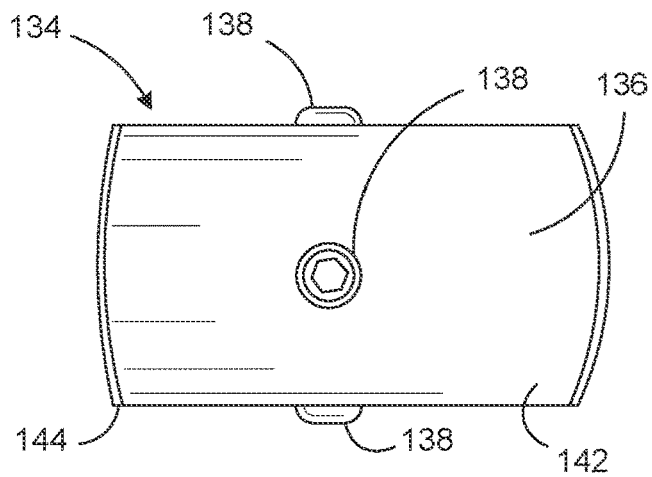
FIG. 3D is a side view of an exemplary embodiment of the connection body described in the present disclosure.

FIG. 3D illustrates a side view of the connection body 134. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least a third setting screw 138, wherein the at least third setting screw 138 can be located at a perpendicular angle to the at least two setting screws 138. The third setting screw 138 may aid the at least two setting screws 138 in clamping and securing the extendable rod 102 to the connection body 134. The connection body 134 also has the bottom end 142 and the top end 144. The threaded screw 140 secures the bottom end 142 of the connection body 134 and prevents leakage of fluids from the sifting scoop 104, as described above in FIGS. 2B-2D. The fastener 146, shown above in FIG. 3B, enters the central throughbore 152 near the top end 144 of the connection body 134. In some aspects of the present disclosure, the extendable rod 102, shown above in FIGS. 1 and 2A, may be secured to the fastener 146 located in the central throughbore 152 of the connection body 134. In other aspects of the disclosure, a first end and a second end of the extendable rod 102, shown above in FIGS. 1 and 2A, may have male or female threading, and matingly engage male or female threading located in the central throughbore 152 of the connection body 134.

Figure 4A:
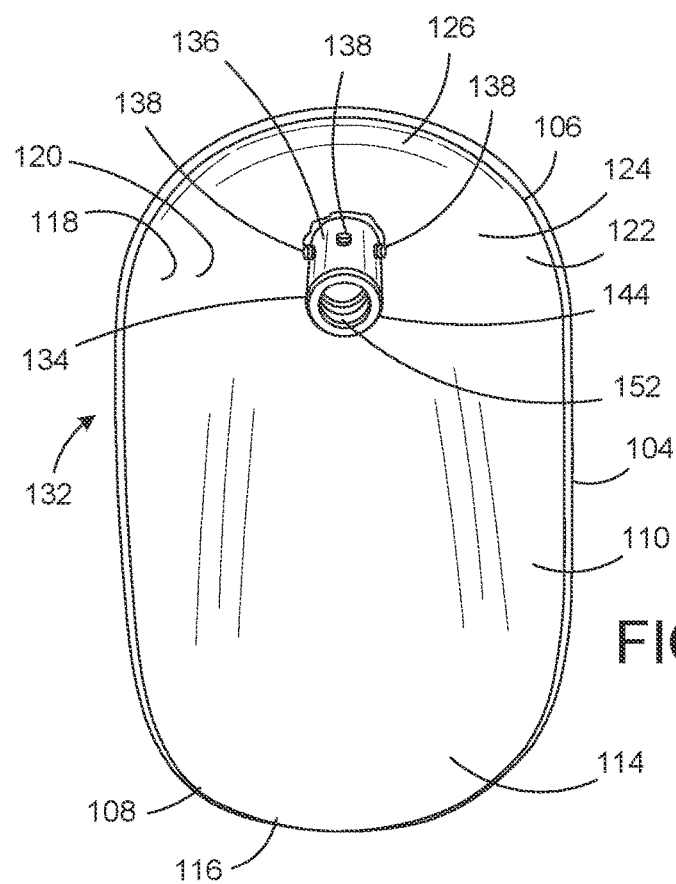
FIG. 4A is a top perspective view of an exemplary embodiment of the internal face of the sifting scoop described in the present disclosure.

FIG. 4A illustrates a top perspective view of the sifting scoop 104. The sifting scoop 104 may have the back end 106 and the front end 108. The sifting scoop has the internal face 110. The internal face 110 may have the floor 114, wherein the floor 114 may extend in the forward direction from the back end 106 and has the front edge 116. The front edge 116 of the floor 114 and portions of the floor 114 may be flat, which allows users to rest the sifting scoop 104 on the ground during use, not shown. The internal face 110 of the sifting scoop 104 may have the left sidewall 118. The left sidewall 118 of the internal face 110 of the sifting scoop 104 may curve upwardly along the left side 120 of the floor 114. The internal face 110 of the sifting scoop 104 may have the right sidewall 122. The right sidewall 122 of the internal face 110 of the sifting scoop 104 may curve upwardly along the right side 124 of the floor 114. The internal face 110 of the sifting scoop 104 may have the back sidewall 126. The back sidewall 126 of the internal face 110 of the sifting scoop 104 may curve upwardly from the floor 114 located at the back end 106 of the sifting scoop 104. The reservoir 132 may be defined by the left sidewall 118, the left side 120 of the floor 114, the right sidewall 122, the right side 124 of the floor 114, and the back sidewall 126. The reservoir 132 may collect sediments and precious metals, not shown.

The opening, not shown, can be bored into the internal face 110 of the back end 106 of the sifting scoop 104. In some aspects of the present disclosure, the opening, not shown, may be added to the back end 106 of the sifting scoop 104 through a mold, not shown. The opening located at the back end 106 of the sifting scoop 104 may receive the connection body 134. In some aspects of the disclosure, the connection body 134 may be placed into the opening located at the back end 106 of the sifting scoop 104 at the angle defined above in FIG. 1. In some aspects of the disclosure, the connection body 134 can be welded to the internal face 110 of the back end 106 of the sifting scoop 104. An external face 136 of the connection body 134 may have at least two openings oriented in opposite directions. At least two setting screws 138 may engage and enter the at least two openings located on the external face 136 of the connection body 134. In some aspects of the present disclosure, the at least two setting screws 138 may secure the extendable rod 102, shown in FIGS. 1 and 2A above, to the connection body 134. Each of the at least two setting screws 138 may clamp the extendable rod 102 to the connection body 134. In some aspects of the present disclosure, the at least two setting screws 138 on the external face 136 of the connection body may comprise at least three setting screws 138, wherein the third setting screw 138 can be located at a perpendicular angle to the at least two setting screws 138. The setting screw 138 may aid the at least two setting screws 138 in clamping and securing the extendable rod 102 to the connection body 134. In some aspects of the present disclosure, the extendable rod 102, shown above in FIGS. 1 and 2A, may be secured to the fastener 146 located in the central throughbore 152 of the connection body 134. In other aspects of the disclosure, a first end and a second end of the extendable rod 102, shown above in FIGS. 1 and 2A, may have male or female threading, and matingly engage male or female threading located in the central throughbore 152 of the connection body 134.

The sifting scoop 104 can separate sediments from heavy elements, precious metals, or precious materials, not shown, by density or specific gravity. Sediment may have a lower density, or a different specific gravity than, the heavy elements, precious metals, or precious materials, which allows sediments to be separated by shaking, twisting, shaking and twisting, or wiggling the extendable rod 102, which in turn wiggles the sifting scoop 104, not shown. The sediments may be removed from the panning tool 100 by shaking separated by shaking, twisting, shaking and twisting, or wiggling the extendable rod 102, which in turn wiggles the sifting scoop 104, shown above in FIG. 1, and the heavy elements, precious materials, or precious metals will stay in the sifting scoop 104. In some aspects of the disclosure, the sifting scoop 104 can be made of a rigid material comprising aluminum, plastic, steel, iron, alloys, or combinations thereof. The sifting scoop 104 material can be corrosion and rust resistant.

Figure 4B:
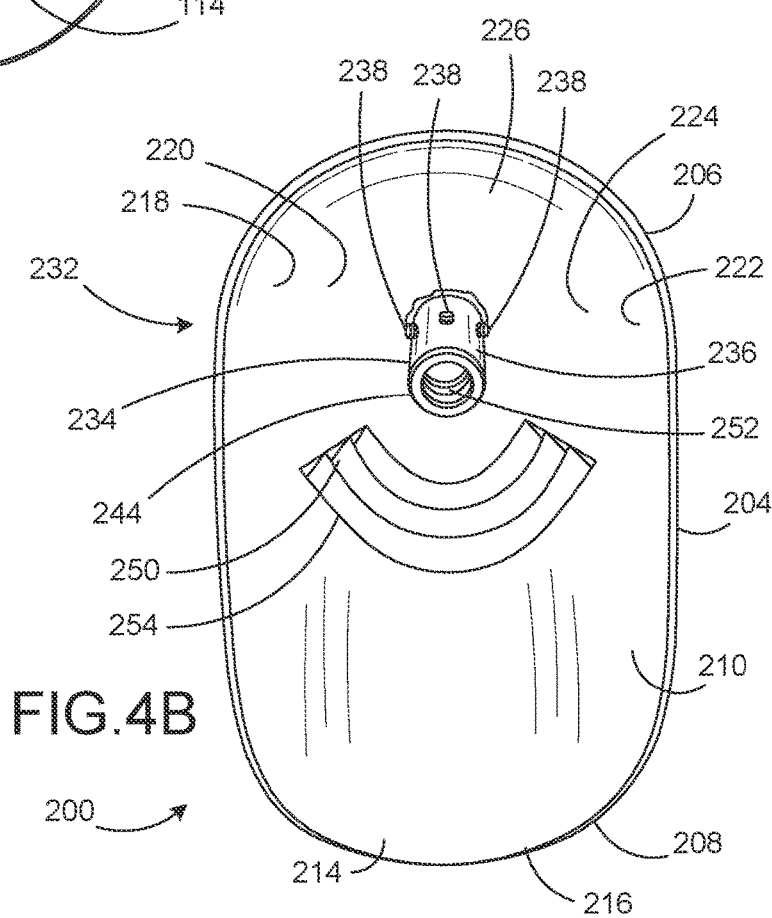
FIG. 4B is a top perspective view of an exemplary embodiment of the internal face of the sifting scoop, in another aspect of the present disclosure.

FIG. 4B illustrates a top perspective view of a sifting scoop 204 of a panning tool 200, in another aspect of the disclosure. The sifting scoop 204 may have a back end 206 and a front end 208. The sifting scoop has an internal face 210 and an external face 212, not shown. The internal face 210 may have a floor 214, wherein the floor 214 may extend in a forward direction from the back end 206 and has a front edge 216. The front edge 216 of the floor 214 and portions of the floor 214 may be flat, which allows users to rest the sifting scoop 204, and the panning tool 200 generally, on the ground during use, not shown. The internal face 210 of the sifting scoop 204 may have a left sidewall 218. The left sidewall 218 of the internal face 210 of the sifting scoop 204 may curve upwardly along a left side 220 of the floor 214. The internal face 210 of the sifting scoop 204 may have a right sidewall 222. The right sidewall 222 of the internal face 210 of the sifting scoop 204 may curve upwardly along a right side 224 of the floor 214. The internal face 210 of the sifting scoop 204 may have the back sidewall 226. The back sidewall 226 of the internal face 210 of the sifting scoop 204 may curve upwardly from the floor 214 located at the back end 206 of the sifting scoop 204. A reservoir 232 may be defined by the left sidewall 218, the left side 220 of the floor 214, the right sidewall 222, the right side 224 of the floor 214, and the back sidewall 226. The reservoir 232 may collect sediments and precious metals, not shown.

An opening, not shown, may be bored into the internal face 210 of the sifting scoop 204's back end 206. In some aspects of the present disclosure, the opening, not shown, may be added to the internal face 210 of the sifting scoop 204's back end 206 through a mold, not shown. The opening, not shown, located at the internal face 210 of the sifting scoop 204's back end 206 may receive the connection body 234. In some aspects of the disclosure, the connection body 234 may be placed into the opening, not shown, located at the internal face 210 of the sifting scoop 204's back end 206 at the angle defined above in FIG. 1. In some aspects of the disclosure, the connection body 234 may be welded to the internal face 210 of the of the sifting scoop 204's back end. An external face 236 of the connection body 234 may have at least two openings oriented in opposite directions. At least two setting screws 238 may engage and enter the at least two openings located on the external face 236 of the connection body 234. In some aspects of the present disclosure, the at least two setting screws 238 may secure the extendable rod 202, not shown, to the connection body 234. Each of the at least two setting screws 238 may clamp the extendable rod 202, not shown, to the connection body 234. In some aspects of the present disclosure, the at least two setting screws 238 on the external face 236 of the connection body may comprise a third setting screw 238, wherein the third setting screw 238 can be located at a perpendicular angle to the at least two setting screws 238. The third setting screw 238 may aid the at least two setting screws 238 in clamping and securing the extendable rod 202, not shown, to the connection body 234. In some aspects of the disclosure, a first end and a second end of the extendable rod 202, not shown, may have male or female threading, and matingly engage male or female threading located in a central throughbore 252 of the connection body 234.

In some aspects of the disclosure, the sifting scoop 204 has riffles 254 located on the internal face 210 of the sifting scoop 204's back end 206. The riffles 254 may separate sediments, not shown, by density or specific gravity. A sample of sediments may be collected at the sifting scoop 204, not shown. The heavy elements, precious metals, or precious materials are mixed in with the sediment and the sediment can have a lower density than the heavy elements, precious metals, or precious materials, such as precious gems, comprising quartz, amethyst, agate, alloys or combinations thereof. The heavy elements, precious metals, or precious materials can be collected at the back end 206 of the sifting scoop 204 in the area defined as the reservoir 232, and may comprise precious metals comprising gold, silver, platinum, alloys, or combinations thereof. The riffles 254 may isolate and separate the precious metals from the sediment, not shown, due to their density or specific gravity, which is different than the density or specific gravity of the sediment. The sediment may comprise a lower density than the precious metals or heavy elements. As the sediment containing the heavy elements or precious metals or materials travel over the riffles 254, the heavy elements are caught by the riffles 254, and the sediment flows over the riffles 254. Some of the heavy elements, precious metals, or precious materials can be collected in the reservoir 232 of the sifting scoop 204 prior to being separated by shaking, twisting, shaking and twisting, or wiggling the extendable rod 202, which in turn wiggles the sifting scoop 204, or within the first few moments of shaking, twisting, shaking and twisting, or wiggling the extendable rod 202, because of their density and/or specific gravity. The sediments can travel forward and over the riffles 254 and may ultimately exit the panning tool 200 from the front edge 216 located at the front end 208 by shaking, twisting, shaking and twisting, or wiggling, the extendable rod 202 of the panning tool 200, and wiggling the sifting scoop 204 side to side.

Figure 5A:
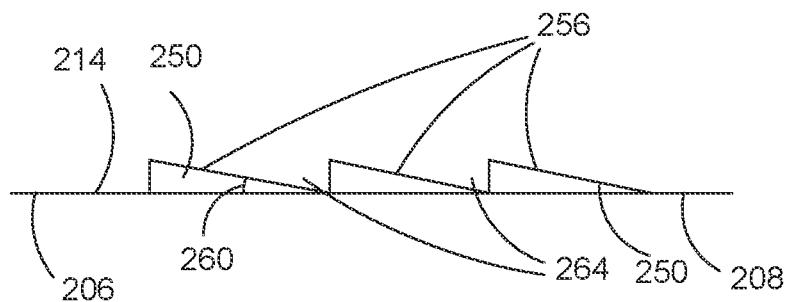
FIG. 5A is a side view of an exemplary embodiment showing a ridge rising from the floor of the sifting scoop.
Figure 5B:
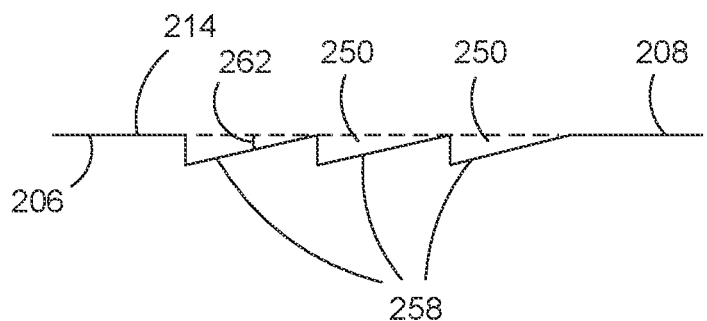
FIG. 5B is a side view of an exemplary embodiment showing a furrow dipping into the floor of the sifting scoop.
Figure 5C:
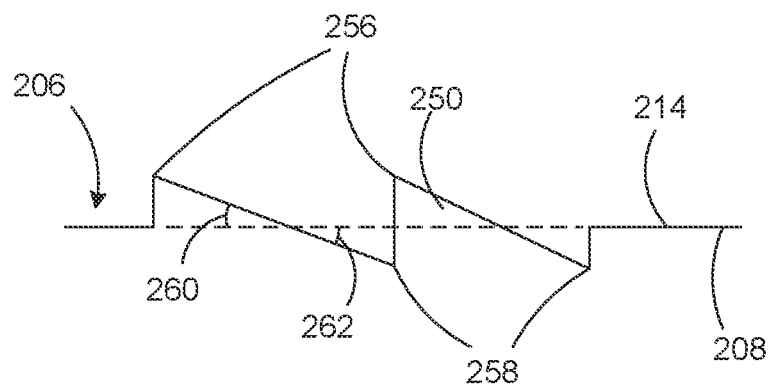
FIG. 5C is a side view of an exemplary embodiment of transvers collector showing a ridge rising from the floor followed by a furrow dipping into the floor of the sifting scoop.
Figure 6A:
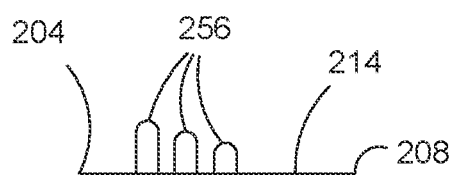
FIG. 6A is a side view of an exemplary embodiment of riffles wherein the ridges decrease in height from the back end towards the front end.
Figure 6B:
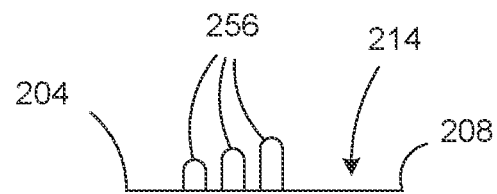
FIG. 6B is a side view of an exemplary embodiment of riffles wherein the ridges increase in height from the back end towards the front end.
Figure 6C:
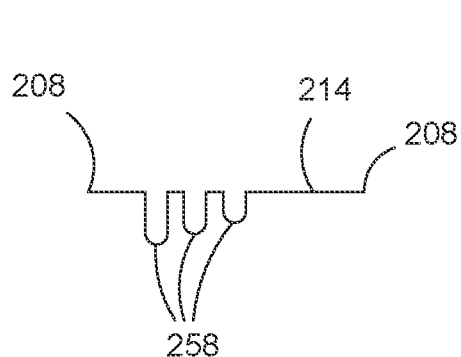
FIG. 6C is a side view of an exemplary embodiment of riffles wherein the furrows decrease in depth from the back end towards the front end.
Figure 6D:
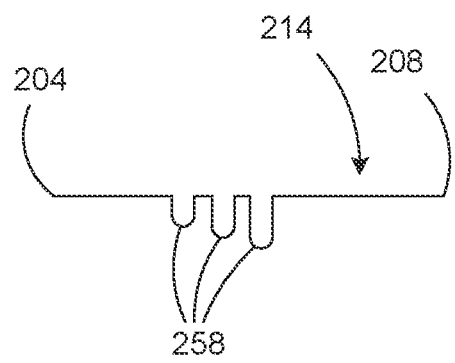
FIG. 6D is a side view of an exemplary embodiment of riffles wherein the furrows increase in depth from the back end towards the front end.

As shown in FIG. 5A-C, the riffles 254 have at least one transvers collector 250 selected from the group consisting of one that rise from floor 214 as a ridge 256, one that dips into the floor as a furrow 258, and a combination thereof. In an embodiment the ridge or furrow is angular as shown in FIGS. 5A-5B. The angles between the floor and the ridge 260 or the furrow 262 can form a right triangle with a right angle sloping back to the floor 114 to form an angle less than 90°. In another embodiment, the riffles 254 can comprise at least two transvers ridge collectors 256 with the height of the collectors selected from the group consisting of decreasing from back to front (FIG. 6A) and increasing from back to front (FIG. 6B). The riffles may also comprise at least two transvers furrow collectors 258 with the depths of the collectors selected from the group consisting of decreasing depth from back to front (FIG. 6C) and increasing depth from back to front (FIG. 6D).

Figure 7A:
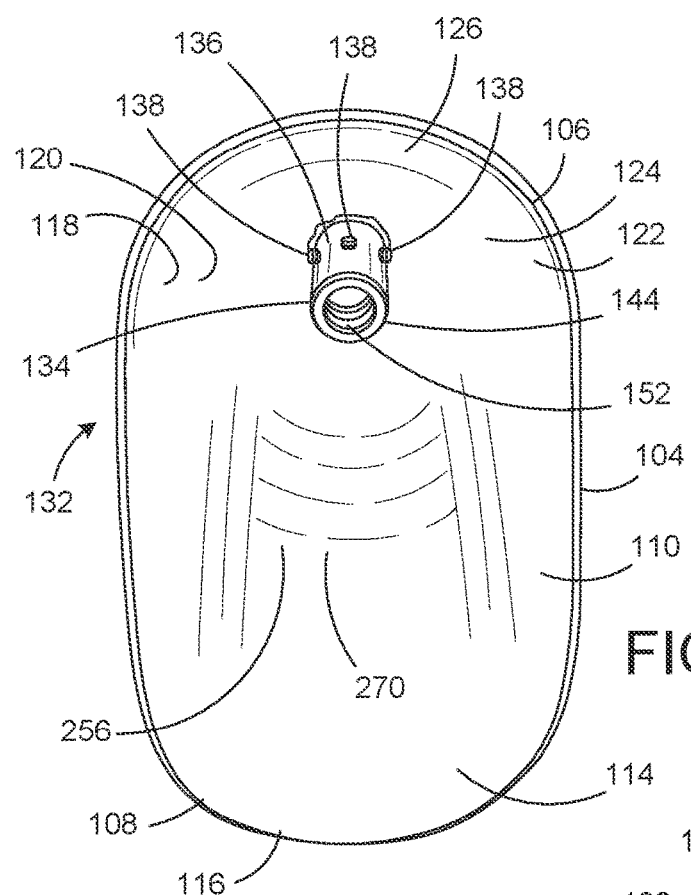
FIG. 7A is a top view of an exemplary embodiment a sifting scoop having riffles that have openings that do not overlap.
Figure 7B:
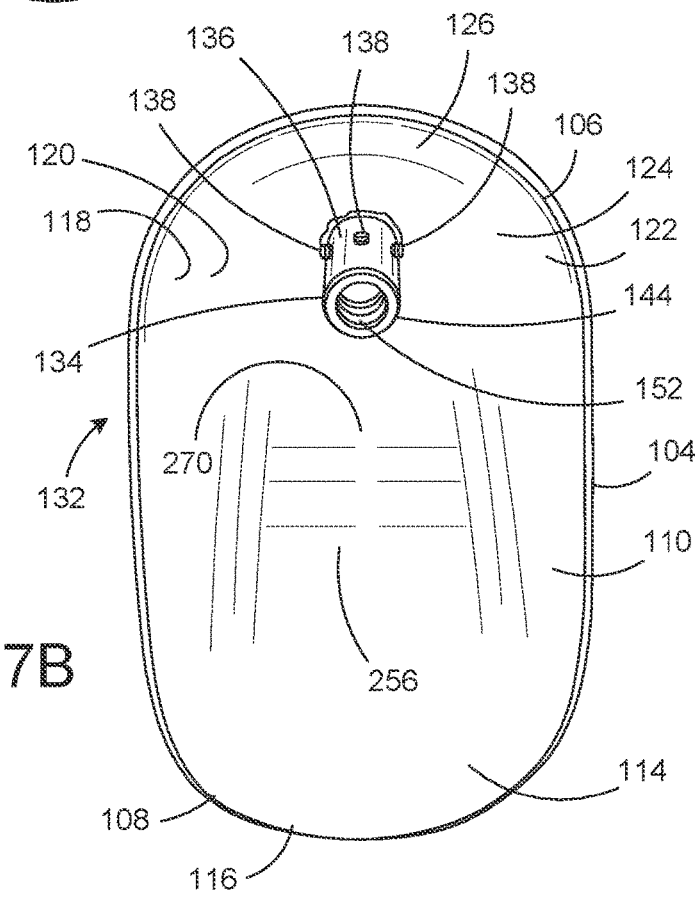
FIG. 7B is a top view of an exemplary embodiment a sifting scoop having riffles that have openings that overlap.

As shown in FIGS. 6A-6D, the riffles 254 and furrows 256 can be rounded. In one embodiment, the difference in height or depth of the collectors can be ⅛ inch. In a further embodiment, the ridge collectors may have one or more openings 270 that may (FIG. 7B) or may not (FIG. 7A) overlap to allow water and lighter sediment to flow out of the reservoir. For furrow collectors, the furrows do not necessarily extend from wall to wall in a manner similar to the ridge collectors with openings that may or may not overlap, not shown. As shown in FIG. 7A, the transverse collectors 250 may be in the form of concentric arcs and as shown in FIG. 7B, the transvers collectors 250 may be linear rows.

In another embodiment, the floor and the upwardly curved back sidewall may be molded more thickly than the rest of the main body (about ¼ inch thicker) to reinforce the area and provide greater thickness to allow for more stable boring and tapping of the opening for the connection body. The curvature of the back side wall may be slightly flattened at the opening for the connection body 134 to flatly sit over the receiving opening. In addition, a second opening may be bored and tapped as an alternative location to affix the connection body (FIGS. 8A-D).

Figure 8A:
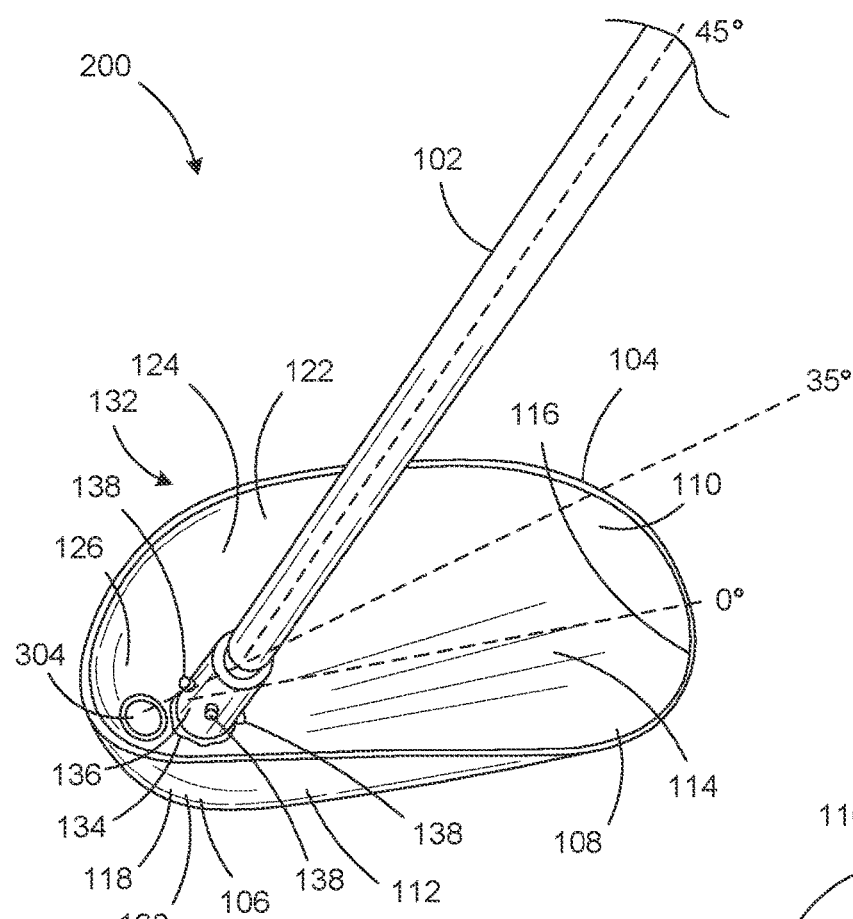
FIG. 8A is a perspective view of an exemplary embodiment of a panning tool having two receiving openings that form different angles between the connecting body and the floor.
Figure 8B:
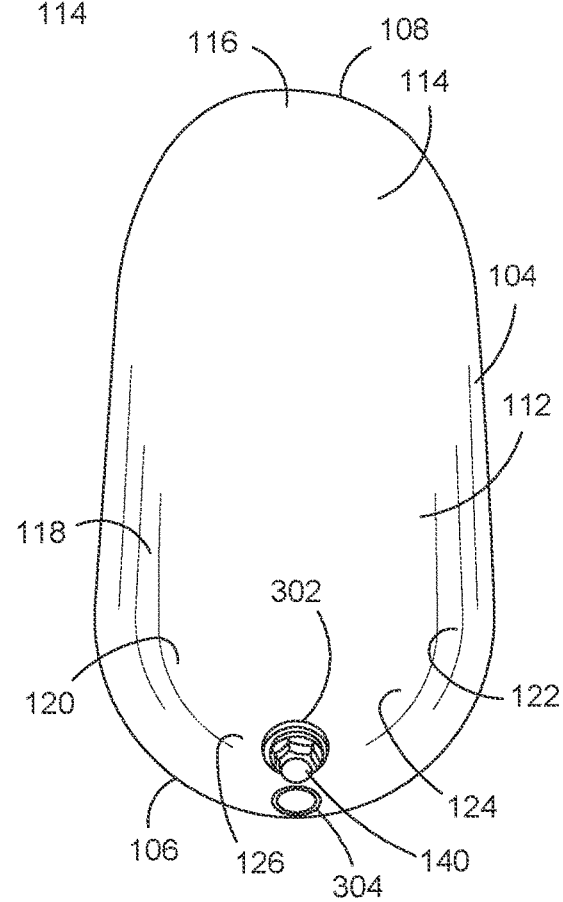
FIG. 8B is a bottom plan view of an exemplary embodiment of the sifting scoop having two receiving openings on or about the back wall.
Figure 8C:
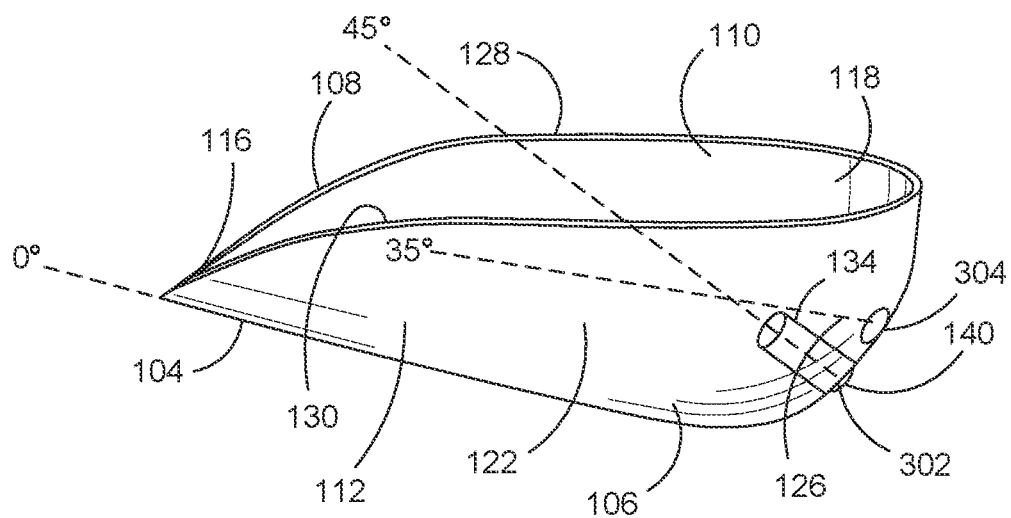
FIG. 8C is a side, transparent view of an exemplary embodiment of the sifting scoop showing two receiving openings, one with a connection body.
Figure 8D:
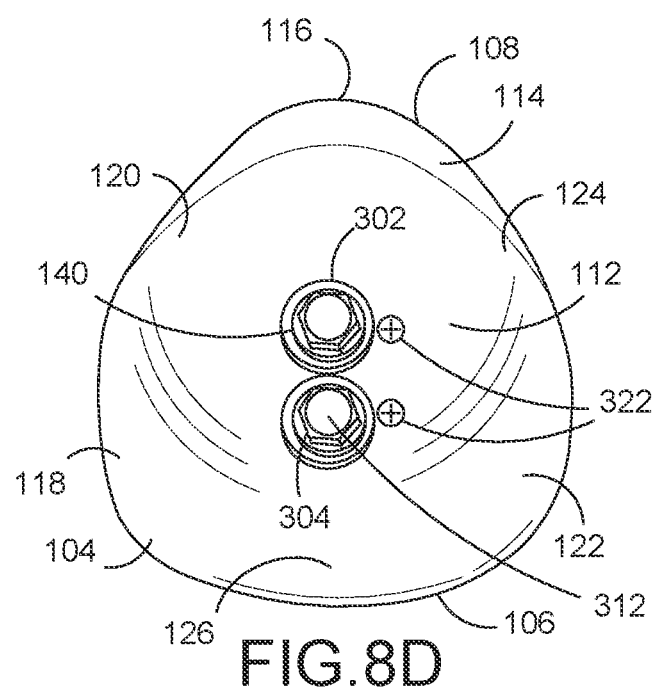
FIG. 8D is a rear plan view of an exemplary embodiment of the sifting scoop showing two receiving openings and two set screws.

Turning to FIG. 8C, two receiving openings for the connection body 134 are illustrated. One receiving opening 302 may create a 45° angle between the connection body and the floor of the sifting scoop 104, while the other receiving opening 304 may create a 35° angle between the connection body and the floor. As illustrated in FIG. 8C, an exemplary embodiment of the receiving opening 302 being engaged with the connection body 134, and the connection body 134 is ready to receive an end of the extendable rod 102. When one receiving opening is engaged with the connection body 134, the other receiving opening can plugged by a plug 312. The plug 312 can be a plug bolt, a plug made out of rubber silicone, plastic, or other material that would stop water from flowing out of the sifting scoop 104 through the receiving opening (302 or 304). As shown in FIG. 8D, the receiving openings 302 and 304 may have at least one set screw 322 passing through the floor 114 of the sifting scoop 104 and into the connection body 134. The set screw 322 can be allen head screws. A threaded screw 140 may be employed to fasten or engage the connection body 134 to the sifting scoop 104.

Figure 9:
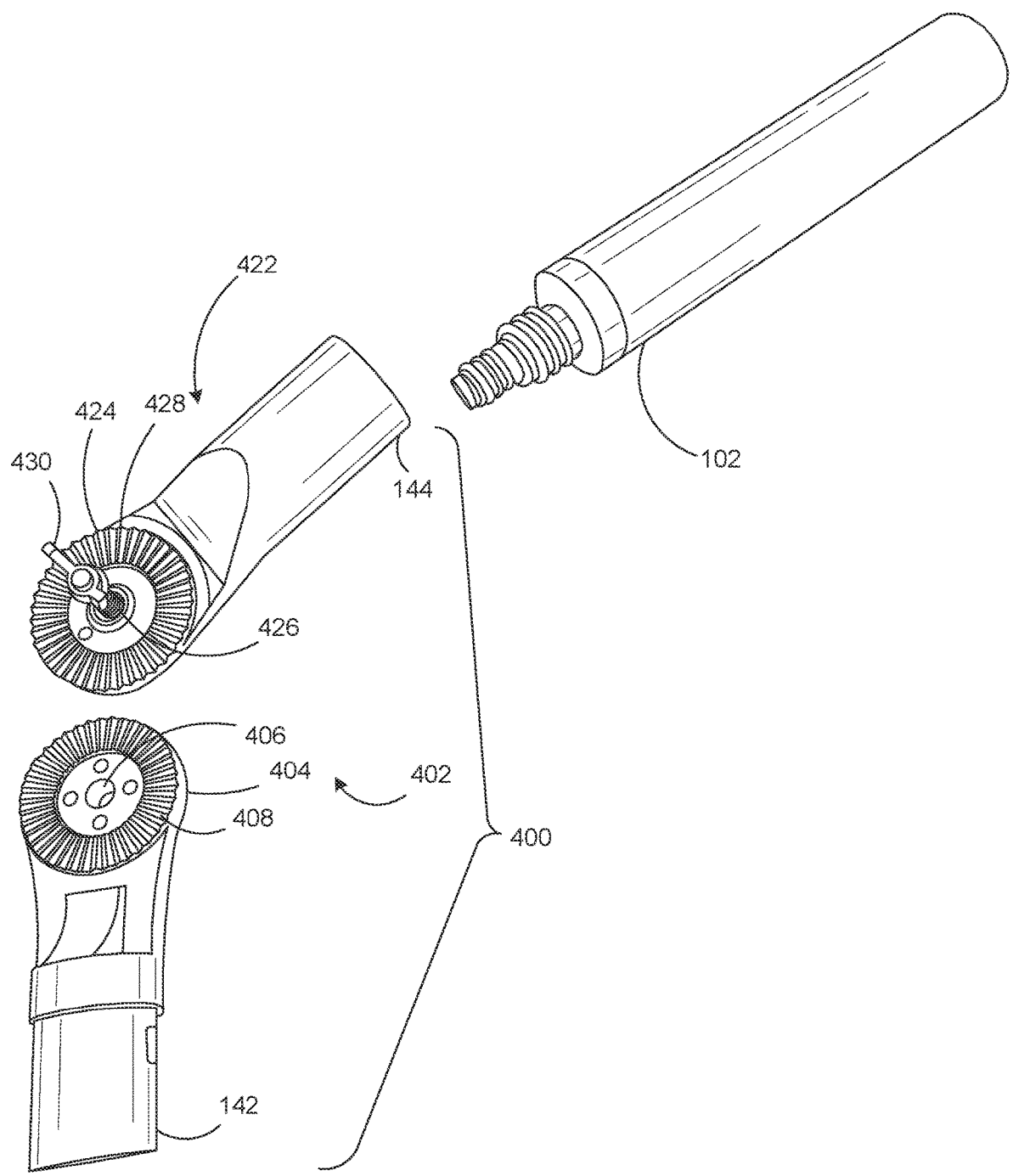
FIG. 9 is a dissembled view of an adjustable handle attachment body.

In a preferred embodiment, FIG. 9 illustrates shows a dissembled view of a preferred embodiment of a connection body 400 wherein the angle of the extending extendable rod 102 can be adjusted. This connection body comprises a bottom section 402 and a top section 422. Bottom section 402 comprises a bottom end 142 (as discussed in a prior embodiment of the connection body 134) that can be connected to the sifting scoop 104 by a threaded screw 140. Bottom end 142 can also be welded or otherwise permanently affixed to sifting scoop 104. Bottom section 402 further comprises a first swivel lock disc 404 having a first centrally disposed through-hole 406 and first radial interdigitations face 408. The connection body top section 422 has a top end 144 as previously discussed, and may have male or female (shown) threading to attach extendable rod 102 (show with male thread). The opposing end of connection body top section 422 comprises a second swivel lock disc 424 having a centrally disposed bolt 426 and a second radial interdigitation face 428.

In operation, bolt 426 is received by through-hole 406 such that radial interdigitation faces 408 and 428 face each other so that the swivel lock discs 404 and 424 may rotate freely when the interdigitations are not locked. However, when nut 430 (shown as a wingnut), is threaded into bolt 426 and tightened until the interdigitations lock into each other, swivel lock discs can no longer rotate, thus fixing the relative angles of connection body bottom section 402 and connection body top section 422 in a specific desired angle. When extendable rod 102 is attached to connection body 400, its angle can be adjusted by loosening nut 430 and rotating one or both swivel lock discs to the desired angle. Bolt 426 can be manufactured to be integral to top section 422 or can be received by a second centrally disposed through-hole (not shown) in second swivel lock disc 424. It is contemplated that the bolt, nut and through-hole arrangement can be reversed between the two discs.

Figure 10:
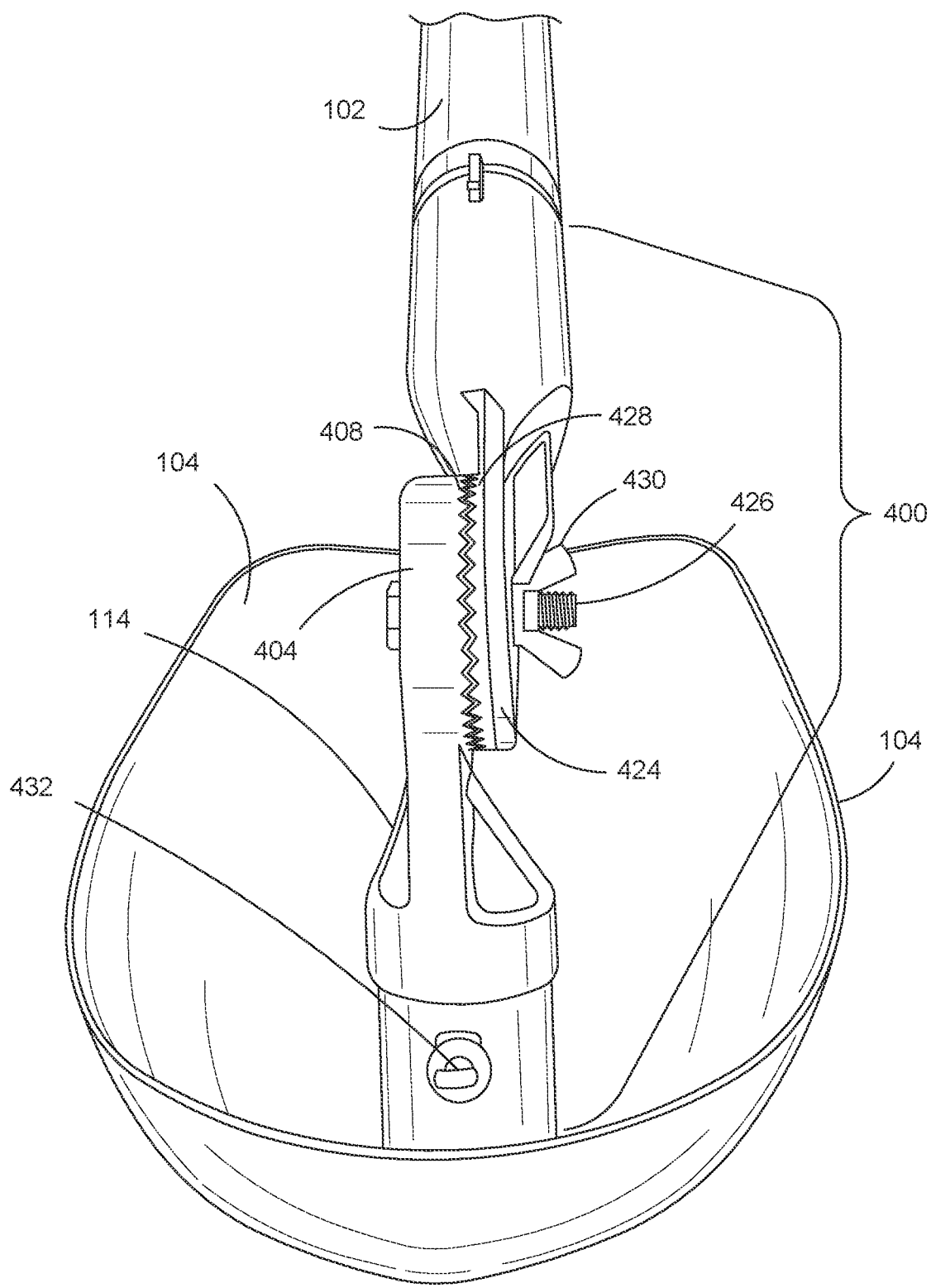
FIG. 10 is rear perspective view of an adjustable handle attachment body connecting a rod to a sifting scoop.

An embodiment where connection body 400 is attached to the sifting scoop 104 is shown in FIG. 10. In this embodiment bolt 426 is received into centrally disposed through-holes in both swivel lock discs 404 and 424 with nut 430 threaded and tightened so that the interdigitations are locked into each other. Although the angle of extendable rod 102 relative to the floor 114 of sifting scoop 104 can be adjusted from 0 degrees past 180 degrees, the preferred angles range from 30 to 60 when sifting precious metals and gems from sediment collected in the sifting scoop 104. Only one receiving opening (302 or 304) may be provided in the floor 114 for this embodiment.

Figure 11:
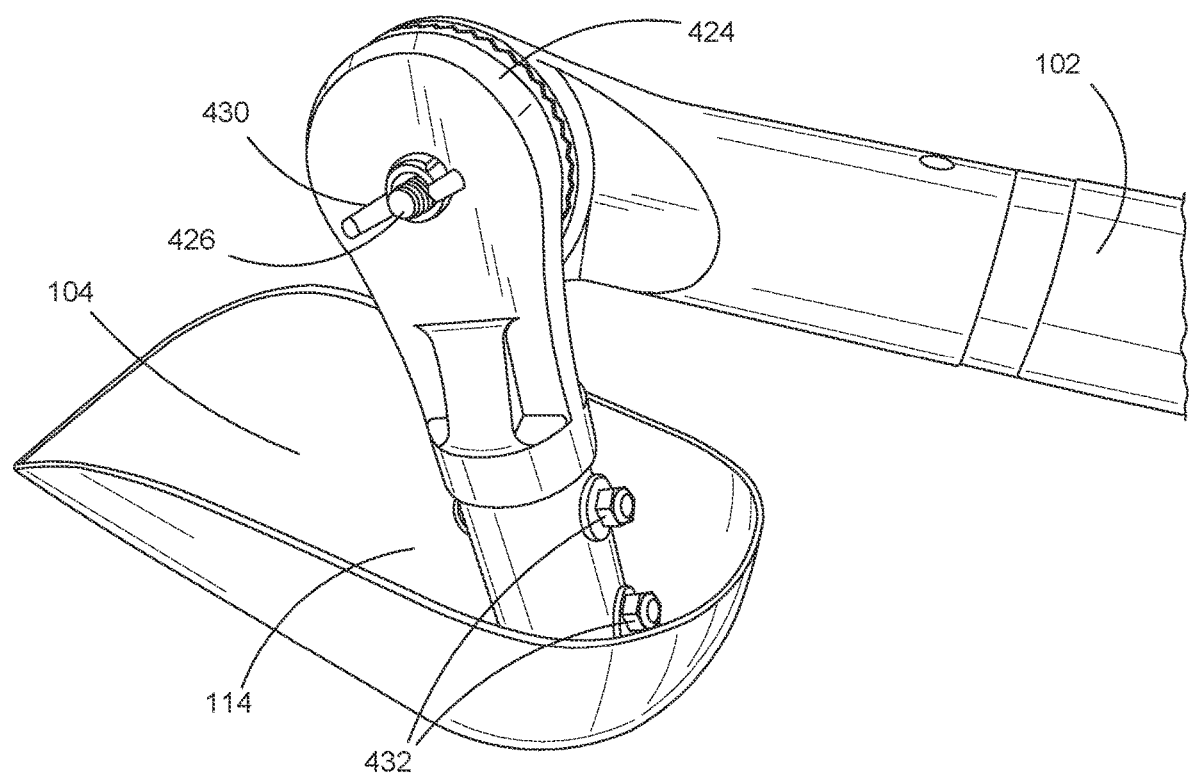
FIG. 11 is a side perspective view of an adjustable handle attachment body connecting a rod to a sifting scoop.

Turning to FIG. 11, a side view of the connection body 400 is illustrated for exemplary purposes. The extendable rod 102 is angled 0 degrees from the floor 114. The floor 114 can be flat in this embodiment and not comprise riffles or furrows.

Figure 12:
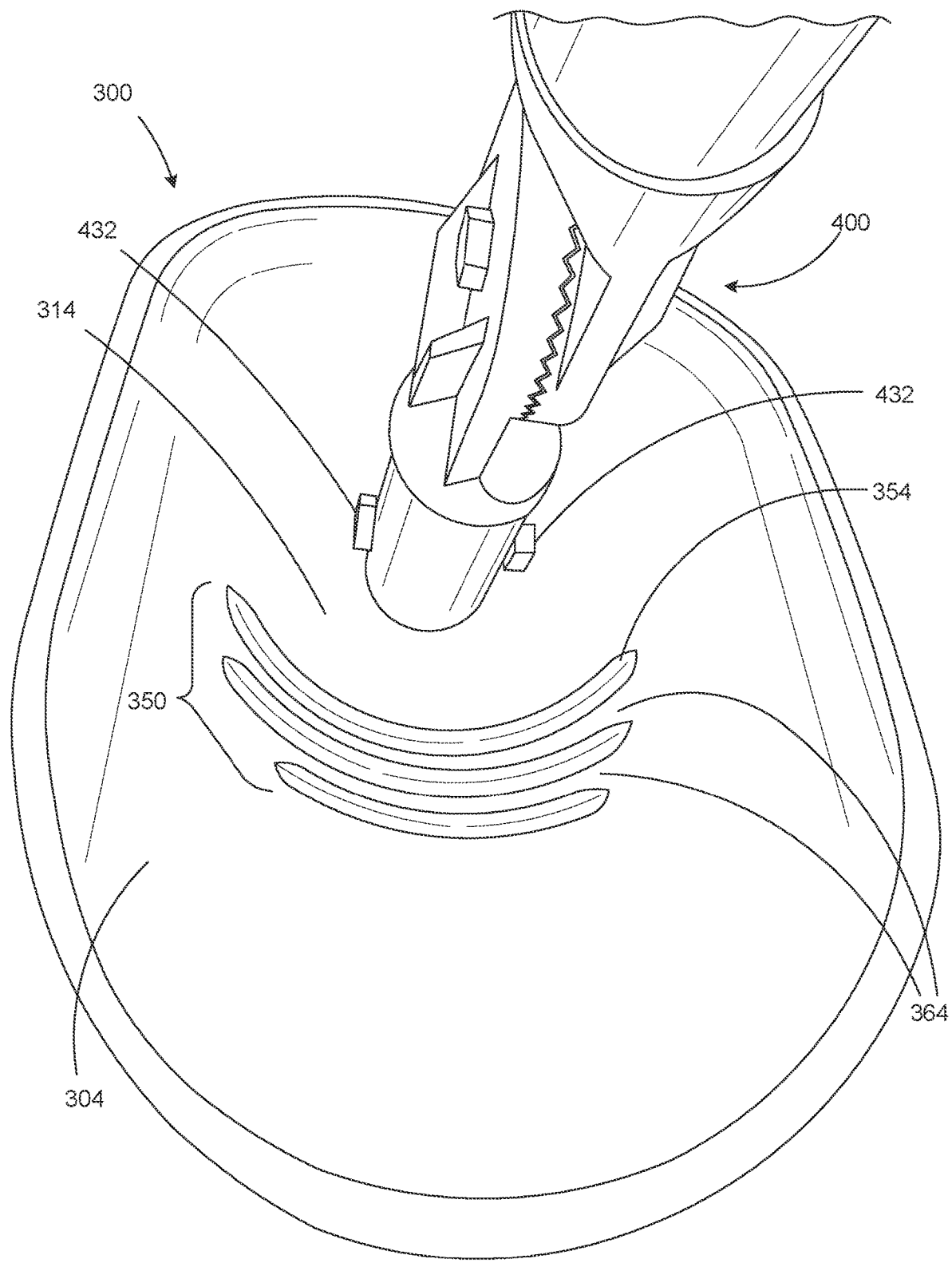
FIG. 12 is a top view of an adjustable handle attachment body connected to a sifting scoop.

Turning to FIG. 12, a top view of another embodiment of the panning tool 300 is illustrated. The sifting scoop 304 may comprise transvers collectors 350 in the form of riffles 354 or furrows 358 (not shown). The transvers collectors 350 slightly curve as they transvers the floor 314. The riffles 354 can comprise an edge or wall that forms a right triangle with a right angle sloping back to the floor 314 to form an angle of 90° or less than 90°. Precious metals and gems can settle out of the flow of sediment and water as the panning tool 300 is wiggled and into the space 364 between the riffles 354. The connection body 400, which is the same from the previous embodiment, is affixed to the floor 314 by a bolt or threaded screw 340 (see FIG. 13) extending through a receiving opening (not shown) and can be affixed at a 35° or 45° angle to the floor 314. As in other embodiments, the floor 314 can be thickened and flattened in the area of the floor 314 of the sifting scoop 304 where the connection body 400 is to sit.

Figure 13:
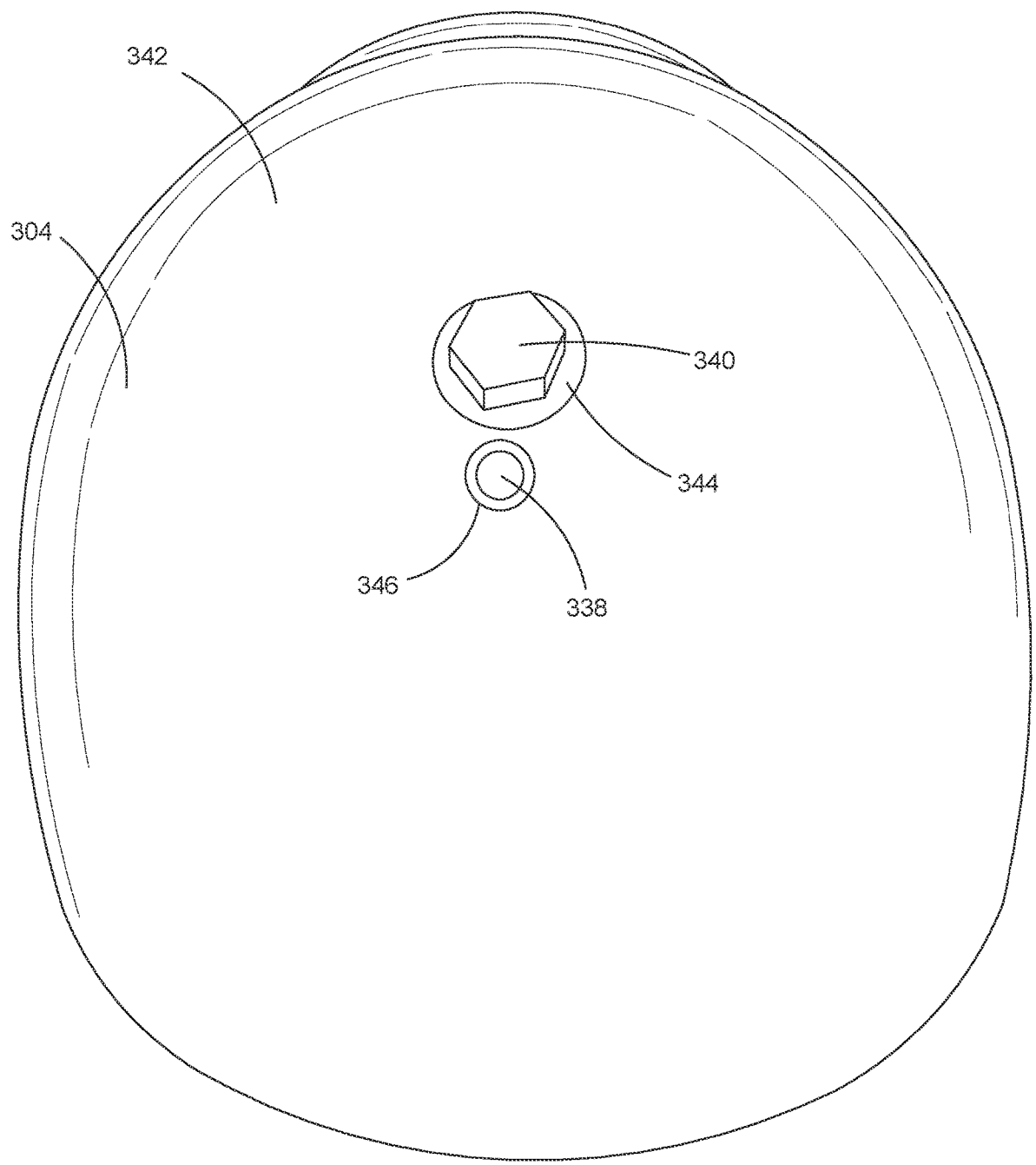
FIG. 13 is a back view of an upside-down scoop.

Turning to FIG. 13, a bottom view of the sifter scoop 304 is illustrated as an example. The bottom 342 of the sifting scoop 304 can comprise at receiving opening (not shown) for receiving a threaded screw or bolt 340. A washer 344 can be employed when engaging the threaded screw or bolt 340 to the sifting scoop 304 through the receiving opening (not shown). A set screw opening 346 can be bored into the sifting scoop 304 near the receiving opening (threaded screw or bolt 340 shown inserted into the opening) for accepting a set screw 338. The set screw 338 can engage and set the connection body 400 (see FIG. 12) to securely fasten the connection body 400 (See FIG. 12) to the floor 314 (see FIG. 12).

Figure 14:
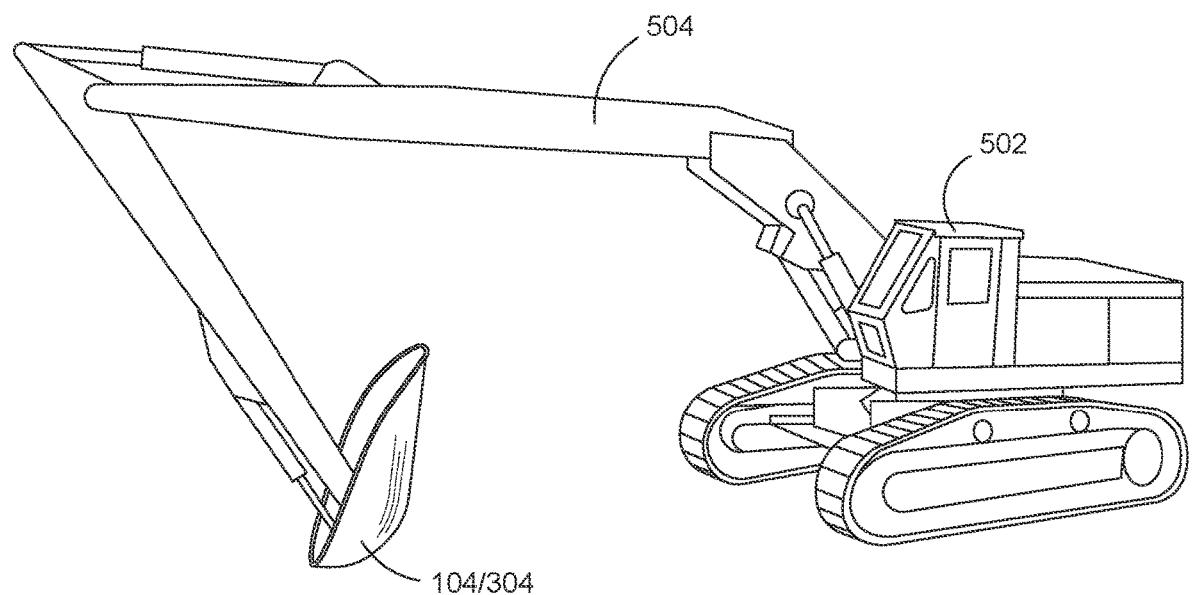
FIG. 14 is a perspective view of a scoop attached to an excavator.

Turing to FIG. 14, a mechanical means for shaking, twisting, shaking and twisting, or wiggling the sifting scoop (104 or 304), such as an excavator 502, is illustrated as an example and can be employed instead of the extendable rod 102 as described on other embodiments. The sifting scoop (104 or 304) can be scaled up in size to be used with a machine. The sifting scoop (104 or 304) can comprise riffles, furrows, or have a flat floor, as described in other embodiments. Instead of panning by hand, one can pan using a machine and the sifting scoop (104 or 304) can be affixed to an arm 504 of the machine, such as an excavator 502.

Since many modifications, variations, and changes in detail can be made to the described preferred embodiments of the invention, it is intended that all matters in the foregoing description and shown in the accompanying drawings be interpreted as illustrative and not in a limiting sense.

Although some, and maybe preferred, embodiments of the disclosure have been described in detail herein, those skilled in the art will recognize that various substitutions and modifications may be made without departing from the scope and spirit of the appended claims. Thus, the scope of the invention should be determined by the appended claims and their legal equivalent.

I claim:
1. A panning tool, comprising:
a sifting scoop comprising:
  a main body comprising a floor, a left side wall, a right side wall, and a back wall,
  wherein the floor has a front edge of the floor, a left side of the floor, a right side of the floor, a back side of the floor, and a center of the floor,
  wherein the left side wall is along the left side of the floor, the right side wall is along the right side of the floor, and the back wall is along the back side of the floor,
  wherein the floor, the left side wall, the right side wall, and the back wall cooperate to define a reservoir having a top edge formed by the left side wall, the back wall, and the right side wall,
  wherein the top edge tapers downward along the left side wall and along the right side wall towards the front edge of the floor; and
a connection body being cylindrically shaped and comprising:
  a top end, a bottom end, a central throughbore, an external face, and at least two openings,
  wherein the central throughbore is adapted to receive a fastener, wherein the at least two openings accept setting screws threaded through the external face of the connection body, and wherein the bottom end of the connection body is affixed to an interior face of the floor of the main body to form a 30-60° angle with the floor of the main body.

2. The panning tool of claim 1,
wherein the main body is a one-piece reservoir and has an upwardly seamless curved connecting edge from the floor up each of the left side wall, the right side wall, and the back wall,
wherein the main body has a first connecting edge between the left side wall and the back wall and a second connecting edge between the right side wall and the back wall, and
wherein each connecting edge between the left side wall, the right side wall, and the back wall is a seamless curved connecting edge.

3. The panning tool of claim 2,
wherein the main body has a first receiving opening and a second receiving opening to alternatively affix the connection body at different angles,
wherein both the first receiving opening and the second receiving opening are on the seamless curved connecting edge between the floor and the back wall, and
wherein the main body further comprises a plug bolt to cover the receiving opening to which the connection body is not affixed.

4. The panning tool of claim 3,
wherein the connection body is affixed to the first receiving opening to form a 45° angle with the floor, and
wherein the connection body is affixed to the second receiving opening to form a 35° angle with the floor.

5. The panning tool of claim 3, further comprising:
riffles,
wherein the riffles have at least one transverse collector on the floor of the main body.

6. The panning tool of claim 5,
wherein the riffles are located between the back side of the floor of the main body and the center of the floor of the main body,
wherein the riffles have at least two transverse collectors, and
wherein the at least two transverse collectors are selected from the group consisting of ridges, furrows, and a combination thereof.

7. The panning tool of claim 6,
wherein the at least two transverse collectors extend from the left side wall to the right side wall,
wherein each of the at least two transverse collectors has at least one opening, and
wherein the at least one opening of each of the at least two transverse collectors is selected from the group consisting of an opening that overlaps with the at least one opening of the other transverse collectors and an opening that does not overlap with the at least one opening of the other transverse collectors.

8. The panning tool of claim 6,
wherein the riffles are selected from the group consisting of at least two transverse collectors that form an arc across the floor and at least two transverse collectors that form linear rows across the floor.

9. The panning tool of claim 1, further comprising:
riffles,
wherein the riffles have at least one transverse collector on the floor of the main body.

10. The panning tool of claim 1,
wherein the bottom end of the connection body is affixed to the sifting scoop through an opening located at the back side of the floor of the main body of the sifting scoop and the top end of the connection body receives an end of a rod.

11. The panning tool of claim 10,
wherein a threaded screw fastens the bottom end of the connection body to the sifting scoop.

12. The panning tool of claim 1,
wherein an action selected from the group consisting of shaking, twisting, wriggling, and a combination thereof is performed by hand on the sifting scoop to separate precious metals and gems from sediment.

13. The panning tool of claim 1,
wherein an action selected from the group consisting of shaking, twisting, wriggling, and a combination thereof is performed by mechanical means on the sifting scoop to separate precious metals and gems from sediment, and
wherein the top end of the connection body receives an arm of a machine.

14. A method of panning precious metals, the method comprising:
inserting an end of an extendable rod into a top end of a connection body of claim 1,
wherein a bottom end of the connection body is affixed to a back side floor of a main body of a sifting scoop of claim 1 to form a panning tool;
dropping a front end of the panning tool into a sediment bed;
collecting sediments with the sifting scoop of the panning tool;
performing an action on the extendable rod to jostle the sifting scoop side to side,
wherein the action is selected from the group consisting of shaking, twisting, wiggling, and a combination thereof;
separating the sediments from heavy elements contained in the sediment with the sifting scoop of the panning tool,
wherein the separating the sediments from heavy elements occurs based on density or weight of the heavy elements,
wherein a back end of the sifting scoop of the panning tool collects a heaviest of elements, and
wherein the back end of the sifting scoop comprises the back side of the floor and the back wall of the main body;
removing the heavy elements from the sifting scoop of the panning tool; and
removing the sediments from the sifting scoop of the panning tool.

15. The method of claim 14,
wherein at least two openings of the connection body accept setting screws threaded through an external face of the connection body, and
wherein the setting screws secure the end of the extendable rod to the connection body.

16. The method of claim 15, further comprising:
welding a joint between the bottom end of the connection body and a reservoir of the sifting scoop.

17. The method of claim 14,
wherein the sediments comprise a lower density than the heavy elements, and
wherein the heavy elements are selected from the group consisting of gold, silver, platinum, jewels, and gems.

18. A panning tool, comprising:
a sifting scoop comprising:
- a main body comprising a floor, a left side wall, a right side wall, and a back wall,
- wherein the floor has a front edge of the floor, a left side of the floor, a right side of the floor, a back side of the floor, and a center of the floor,
- wherein the left side wall is along the left side of the floor, the right side wall is along the right side of the floor, and the back wall is along the back side of the floor,
- wherein the floor, the left side wall, the right side wall, and the back wall cooperate to define a reservoir having a top edge formed by the left side wall, the back wall, and the right side wall,
- wherein the top edge tapers downward along the left side wall and along the right side wall towards the front edge of the floor, and
- at least one receiving opening in the floor, and
- at least one setting screw opening in the floor near the at least one receiving opening; and a connection body comprising:
- a connection body bottom section, a connection body top section, a first radial interdigitation face, and a second radial interdigitation face,
- wherein the connection body bottom section has a first swivel lock disc with a first radial interdigitation face and the connection body bottom section attaches to the at least one receiving opening in the floor,
- wherein the connection body top section has a second swivel lock disc with a second radial interdigitation face,
- wherein both of the radial interdigitation faces complement each other to prevent the swivel lock discs from rotating when they are tightened against each other, and
- wherein the connection body is affixed to the floor of the main body by a bolt threaded through the at least one receiving opening.

19. The panning tool of claim 18,
wherein both swivel lock discs have a centrally disposed through-hole and a bolt is received in the through-holes and secured by a wingnut.

20. The panning tool of claim 18, further comprising: riffles on the floor of the sifting scoop.

21. A method of panning precious metals comprising:
inserting an end of an extendable rod into a connection body top section of claim 18,
- wherein the connection body top section is affixed to a back side floor of a main body of a sifting scoop claim 18 to form a panning tool;

loosening a first radial interdigitation face and a second radial interdigitation face so that they do not lock;
adjusting an angle of the extendable rod relative to the sifting scoop;
tightening both of the radial interdigitation faces against each other to prevent the swivel discs from rotating;
dropping a front end of the panning tool into a sediment bed;
collecting sediments with the sifting scoop of the panning tool;
performing an action on the extendable rod to jostle the sifting scoop side to side,
- wherein the action is selected from the group consisting of shaking, twisting, wiggling, and a combination thereof;

separating the sediments from heavy elements contained in the sediment with the sifting scoop of the panning tool,
- wherein the separating the sediments from heavy elements occurs based on density or weight of the heavy elements,
- wherein a back end of the sifting scoop of the panning tool collects a heaviest of elements, and
- wherein the back end of the sifting scoop comprises the back side of the floor and the back wall of the main body;

removing the heavy elements from the sifting scoop of the panning tool; and
removing the sediments from the sifting scoop of the panning tool.

22. The method of claim 21,
wherein the loosening and tightening of the radial interdigitation faces is accomplished by loosening and tightening a nut threaded onto a bolt that is received by a centrally disposed through-hole in each swivel lock disc.

* * * * *